F. SCHILZ.
PAPER FEEDING DEVICE.
APPLICATION FILED AUG. 14, 1905.

974,923.

Patented Nov. 8, 1910.
12 SHEETS—SHEET 1.

Fig. 1.

WITNESSES:

INVENTOR
BY
ATTORNEYS

F. SCHILZ.
PAPER FEEDING DEVICE.
APPLICATION FILED AUG. 14, 1905.

974,923.

Patented Nov. 8, 1910.
12 SHEETS—SHEET 2.

Fig. 2.

WITNESSES:

INVENTOR
Frank Schilz
BY
ATTORNEYS

F. SCHILZ.
PAPER FEEDING DEVICE.
APPLICATION FILED AUG. 14, 1905.

974,923.

Patented Nov. 8, 1910.
12 SHEETS—SHEET 3.

Fig. 3.

WITNESSES

INVENTOR
Frank Schilz
BY
Erwin Wheeler
ATTORNEYS

F. SCHILZ.
PAPER FEEDING DEVICE.
APPLICATION FILED AUG. 14, 1905.

974,923.

Patented Nov. 8, 1910.
12 SHEETS—SHEET 7.

WITNESSES:

INVENTOR
Frank Schilz
BY
ATTORNEYS

F. SCHILZ.
PAPER FEEDING DEVICE.
APPLICATION FILED AUG. 14, 1905.

974,923.

Patented Nov. 8, 1910.
12 SHEETS—SHEET 9.

*Fig. 11.*

WITNESSES:

INVENTOR

ATTORNEYS

F. SCHILZ.
PAPER FEEDING DEVICE.
APPLICATION FILED AUG. 14, 1905.

974,923.

Patented Nov. 8, 1910.
12 SHEETS—SHEET 10.

WITNESSES:

INVENTOR
Frank Schilz
BY Erwin E. Wheeler
ATTORNEYS

F. SCHILZ.
PAPER FEEDING DEVICE.
APPLICATION FILED AUG. 14, 1905.

974,923.

Patented Nov. 8, 1910.
12 SHEETS—SHEET 12.

WITNESSES:

INVENTOR.
BY
ATTORNEYS

UNITED STATES PATENT OFFICE.

FRANK SCHILZ, OF MILWAUKEE, WISCONSIN, ASSIGNOR TO HUGO LOEWENBACH, OF MILWAUKEE, WISCONSIN.

PAPER-FEEDING DEVICE.

974,923. Specification of Letters Patent. Patented Nov. 8, 1910.

Application filed August 14, 1905. Serial No. 274,151.

*To all whom it may concern:*

Be it known that I, FRANK SCHILZ, a citizen of the United States, residing at Milwaukee, county of Milwaukee, and State of Wisconsin, have invented new and useful Improvements in Paper-Feeding Devices, of which the following is a specification.

My invention relates to improvements in paper feeding devices, and pertains especially to that class of devices which are used for feeding paper from a pile or package to a printing or ruling machine.

The object of my invention is to provide means whereby the sheets of paper, after having been individualized or separated from a package or pile, may be fed with regularity at equal intervals and accurately alined before reaching the printing or ruling machine and any errors or irregularities in the individualizing or separating process may be either automatically corrected, or the machine stopped.

In the following description reference is had to the accompanying drawings, in which—

Like parts are identified by the same reference characters throughout the several views.

Figure 1:
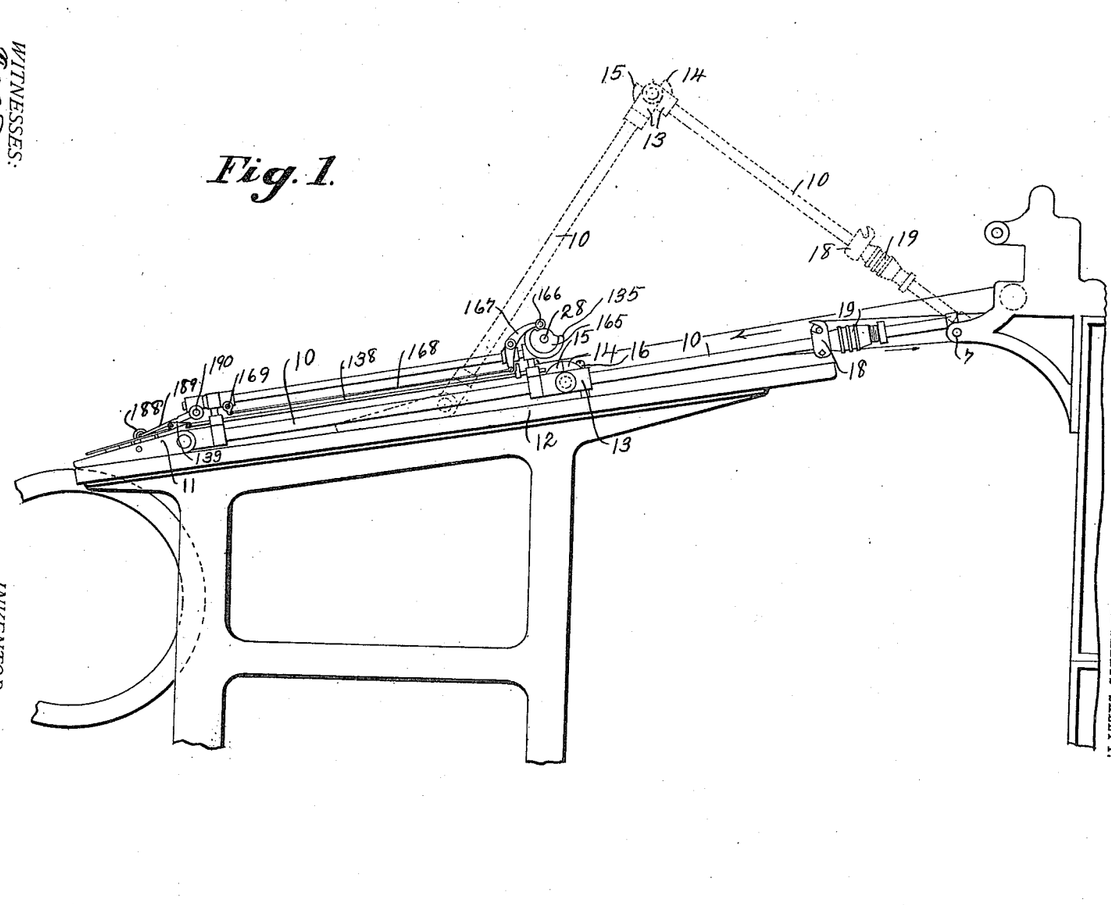
Figure 1 is a general side view of my invention, with dotted lines indicating the conveyer in a partially folded position.
Figure 2:
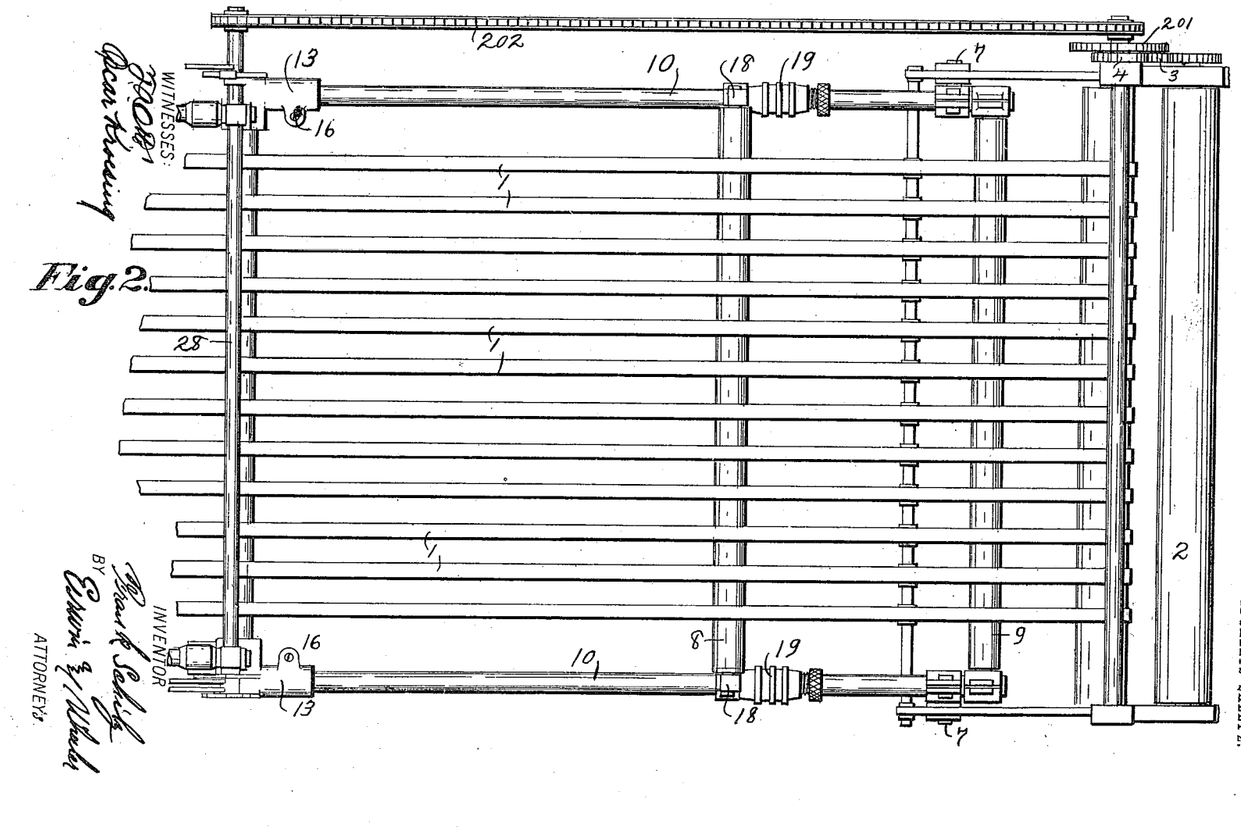
Figs. 2 and 3 are plan views of the upper and lower portions of a feeding conveyer embodying my invention, with the sheet testing devices and strikers omitted.
Figures 4, 5:
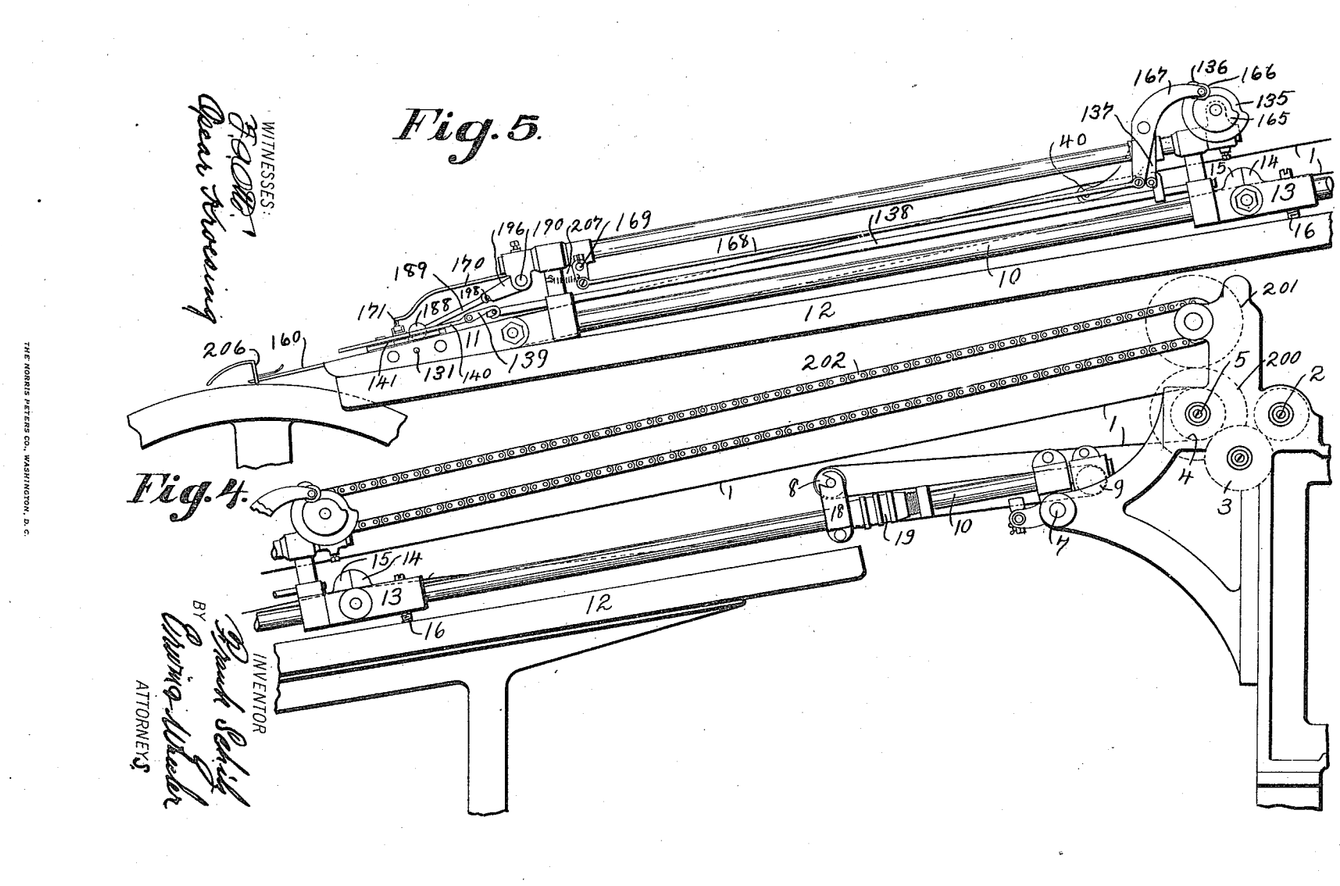
Figs. 4 and 5 are side views of the same as seen from the same side as shown in Fig. 1, but on a larger scale.

A series of conveyer tapes 1 receive the paper from the sheet separating or individualizing machine, or if desired, from the hands of an operator who separates them from a package or pile; the apparatus, however, being more especially intended to receive the sheets from a machine such as shown in United States Patent #751,687, dated February 9th 1904, and which was issued to me for a paper feeding machine. In Fig. 4, 2 illustrates the driving shaft of such a machine, and 3 and 4 are the gear wheels and pinions, whereby motion is transmitted to a shaft 5 which drives the conveyer tapes 1. At the lower end of the conveyer, these tapes are passed over a roller 6 and near the upper or front end of the conveyer, they are passed over a roller 9 near the pivot shaft 7 on the under side, and then over an adjustable roller 8 located between the upper and lower portions of the belts or tapes, and in the rear of the shafts 9 and 7, this roller 8 being adjusted as hereinafter explained to take up any slack in the tapes. Frame rods 10 are supported from the pivot shaft 7 near their upper ends, and at their lower ends, these rods are connected with a head piece 11 which rests upon an inclined platform 12. The rods 10 are formed in sections, having a one-way hinged joint 13, the respective sections having abutments 14 and 15 which contact with each other when the frame is in normal position, as clearly shown in Figs. 4 and 5. A set screw 16 supports the upper section from the platform 12 near the joint 13. The roller 8 is supported from the rods 10 at each side of the machine by bearing blocks 18. These blocks 18 are adjusted by means of nuts 19, having screw threaded engagement with a portion of the rod 10, or a threaded sleeve located thereon. With this construction of the frame, its central portion may be lifted, as indicated by dotted lines in Fig. 1, and the lower end drawn forwardly, thus permitting free access to the printing press for repairs, or for any other purpose, without disturbing the installation of the feeding machine.

The tapes 1, which form the conveyer, receive the paper on the upper side. The tapes run in the direction indicated by arrows in Fig. 1, and carry the sheets downwardly until their motion is arrested by the hooks 21 of the strikers. These hooks 21 are supported from an oscillatory shaft 22 (see Figs. 2, 12, 13, and 15) by means of spring arms 23, which extend between elastic holding plates 24, which are supported from a rod 25. The holding plates 24 and arms 23 project in a trailing position from their respective supports along the line of conveyer movement. The striker hooks 21 are lifted at definite intervals to release the sheet engaged thereby. To lift these hooks 21, a cam 27 is mounted on a rotary cross shaft 28. An arm 29 is loosely connected with the rod 25 and is provided with a roller 30 resting upon the eccentric margin of the cam, whereby, as the cam is rotated, the arm 29 will be oscillated. When the arm 29 is oscillated, its motion is communicated through the lugs 32 and 33 to the shaft 22, whereby the arms 23 thereon are raised and lowered. The lug 33 is rigidly connected with the shaft 22. The function of the striker hooks is to regulate the feed of the sheets so that whenever the separation of the sheets from the pile is reasonably accurate and constant, they will be adjusted by the strikers at equal distances from each other, and fed to the printing machine with perfect regularity. However, if, for any reason, the sheets, as separated from the pile, should be lapped upon each other, this is detected, and both the feeding machine and the printing press stopped by means of a plural sheet calipering device located a short distance below the strikers. A testing device located a little above the strikers is also employed to stop the machinery in case of the absence of a sheet when the striker hooks are about to be lifted. To facilitate the operation of the plural sheet calipering device, the tapes are passed over a transverse roller 40 which prevents them from sagging. A calipering wheel 41 is used for detecting the presence of more than one sheet on this part of the conveyer. This wheel 41 is supported by a lever 42 pivoted to the cross rod 43, with the wheel resting upon one of the tapes directly over the roller 40, whereby as the paper is carried by the tapes underneath the wheel, the latter is slightly lifted, and its motion transmitted and compounded in the levers 42, 45 and 46. In case two or more sheets are carried underneath the wheel 41, sufficient motion is thus transmitted to disengage a trip catch 47 from an arm 48 on a cam 49, the latter being thus permitted to swing by gravity into contact with a rotary wheel 52 on the shaft 28, whereupon the point of the cam will engage with the teeth 51 on the wheel and will be lifted by the wheel to disconnect the machine from the source of power, as hereinafter explained. The cam and the wheel 52 are provided respectively with peripheral teeth 50 and 51, which mesh with each other when the cam is released from the catch 47 and after the point of the cam has been carried upwardly and over by the continued rotation of the wheel,—the cam teeth causing the cam to rotate until it is restored to its original position. By thus providing for automatically restoring the cam, the necessity for manual resetting is avoided.

The pivotal fulcrums 55 and 56 of the levers 45 and 46 consist of stud shafts projecting from a frame piece 58, which is supported by the cross rod 43. The lever 45 is connected with the lever 46 through an arm 61 pivoted to the stud shaft 56, and provided with bearings for a worm shaft 65 which meshes with a toothed segment 66 on the rear end of lever 46, whereby the worm shaft may be turned to so adjust the catch 47 with reference to the arm 48 that a single sheet of paper passing underneath the wheel 41 will not cause the release of the catch. The worm shaft 65 is readjusted whenever there is a material change in the thickness of the paper to be fed.

Figure 8:
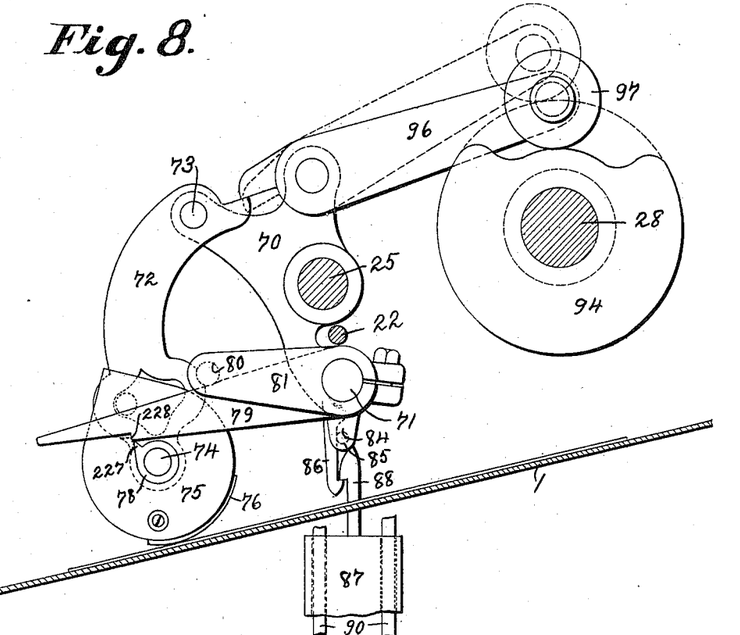
Fig. 8 is a detail side view of a testing device for stopping the machine in the absence of a sheet during the interval when it should be present.
Figure 9:
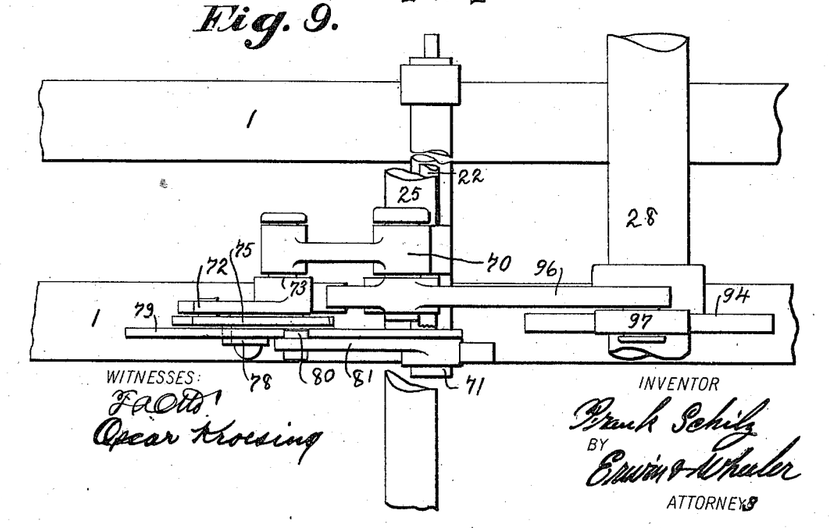
Fig. 9 is a plan view of the parts shown in Fig. 8.
Figure 11:
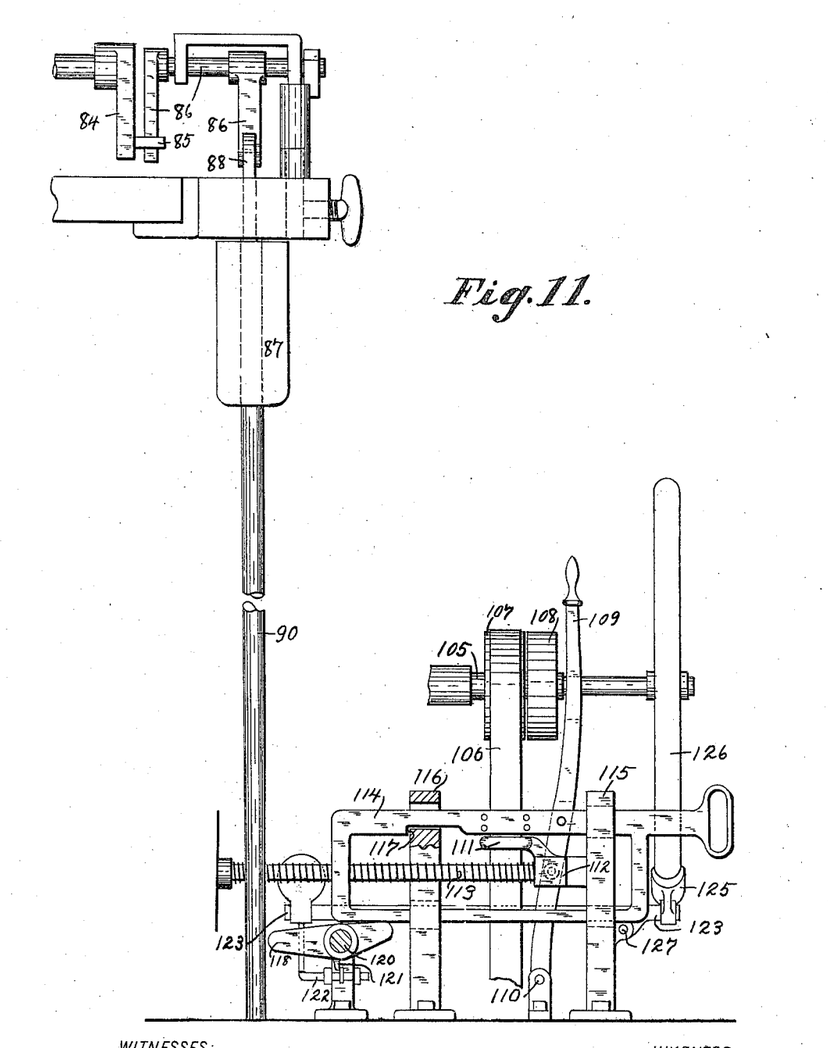
Fig. 11 is a view, in front elevation, of a belt shifter and brake mechanism controlled by the calipers.
Figure 12:
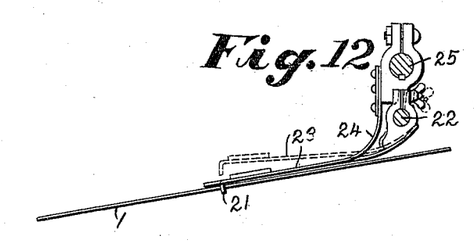
Fig. 12 is a detail side view of one of the strikers showing the supporting shafts in cross section.
Figure 13:
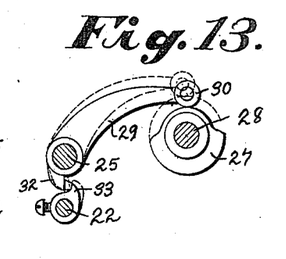
Fig. 13 is a detail side view of the striker operating cam and connections for oscillating the striker shafts; the shafts being shown in cross section.

The testing device for detecting the absence of a sheet is supported from the cross rod 25, as best shown in Fig. 8. A bracket 70, mounted upon this cross rod, is also loosely supported from an oscillatory bar 71. An arm 72 is pivotally connected at 73 with this bracket, and carries a stud shaft 74 at its lower end, on which a friction member 75 is mounted to oscillate. This friction member normally occupies the position on its pivotal support in which it is shown in Fig. 8, and its lower margin is provided with a frictional contact surface of rubber, or other suitable material 76, adapted, when brought in contact with a moving surface, to adhere thereto with sufficient force to oscillate the member 75 on the stud shaft 74 and communicate motion from said member to oscillate the bar 71 by means of a cam 78, lever 79, pin 80, and arm 81; the latter being fast on the bar 71, and the pin 80 being arranged to project laterally over the lever 79 at an intermediate point on said lever. The member 75 ordinarily is not lifted high enough to operate the lever 79, but when rotated to bring the cam projection 227 to a vertical position or to a point where it engages in the notch 228, it will then lift lever 79 during the next upward movement of member 75 sufficiently to actuate the arm 81 as above described. When the bar 71 is oscillated, its motion is communicated through an arm 84, and pin 85 to actuate a swing latch 86, from which a weight 87 is normally suspended by means of a catch 88. When the latch 86 is actuated by the pressure of the pin 85 thereon it is disengaged from the catch 88 and the weight is permitted to drop vertically on its guide rods 90 to disconnect the power and bring the machinery to rest, as hereinafter explained, and as best illustrated in Fig. 11. A cam 94 on the rotary shaft 28 is employed to lift the member 75 during the proper intervals of sheet release, or while the strikers are in a raised position Motion is transmitted from the cam 94 to the member 75 through a lever 96, one end of which is arranged to engage the upper or short end of the lever 72. The lever 96 is provided with a wheel 97 which travels on the periphery of the cam 94 and permits the member 75 to drop by gravity into contact with the sheet of paper for a short interval, when the latter is being held at rest by the strikers. Should the sheet be absent during this interval, the friction surface 76 is brought in contact with the moving conveyer tape and oscillated to release the weight 87 as above explained. When a sheet is present, however, the same is held by the strikers during the period of contact, so that no motion is transmitted, and the member 75 is lifted by the cam 94 before the sheet of paper is released.

Figure 6:
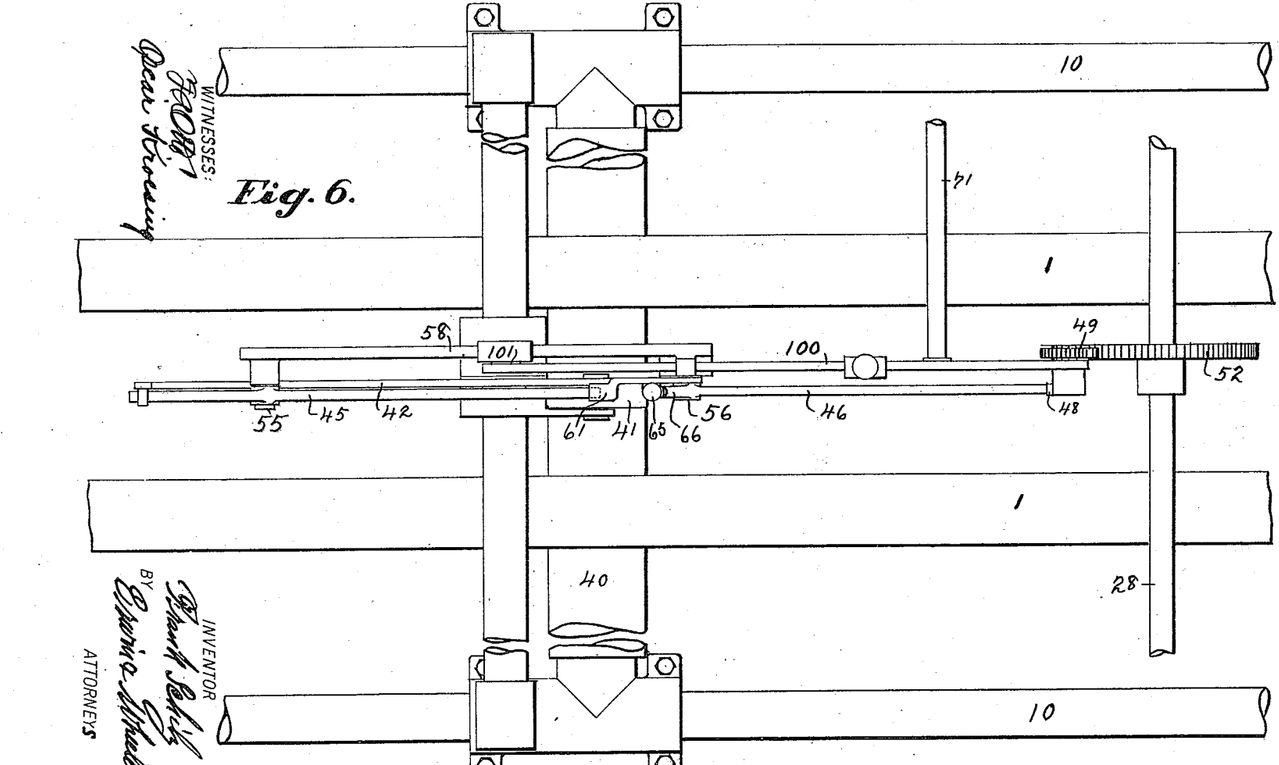
Fig. 6 is a detail plan view of the conveyer showing the plural sheet calipering mechanism.
Figure 7:
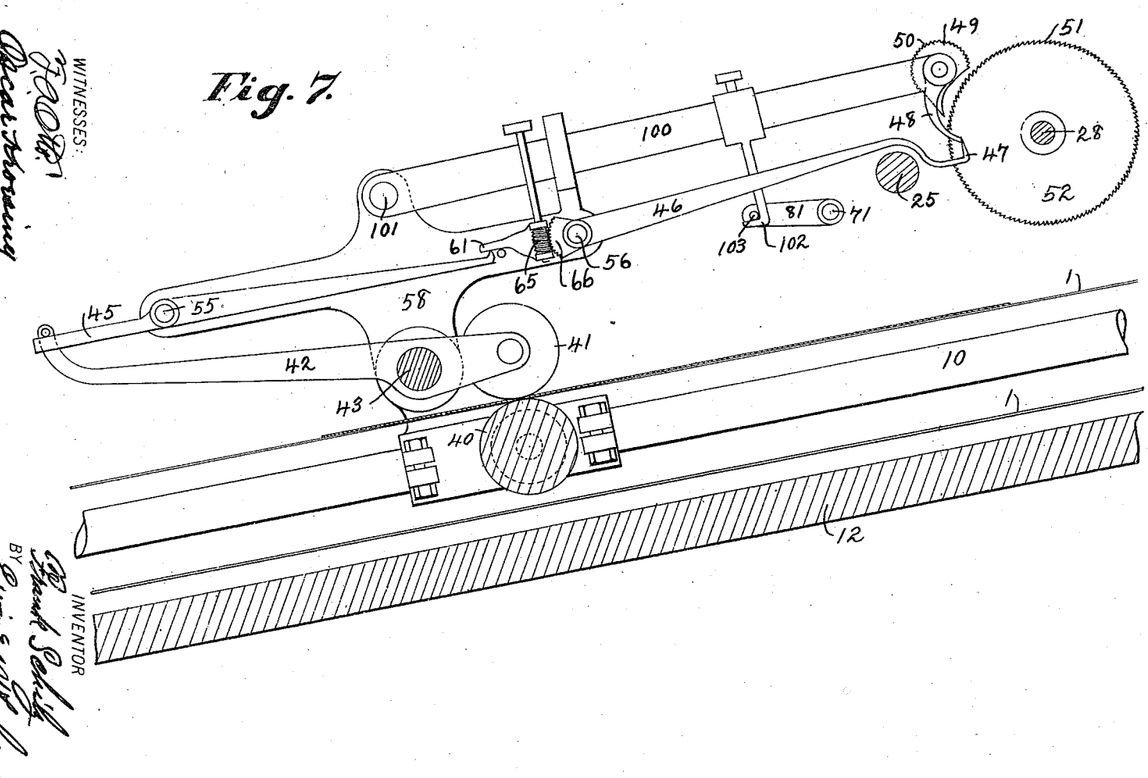
Fig. 7 is a detail side view of a caliper for stopping the machine, in case two sheets are fed simultaneously.

Referring again to Fig. 7, it will be observed that the cam 49 is mounted upon a bar 100, which is pivoted to the frame at 101, and is provided with a hook shaped hanger 102 adapted to engage a pin 103 on the arm 81 when the bar 100 is lifted by the cam 49 rotating in contact with the wheel 52, this motion being thus rendered also effective to release the weight 87 by swinging the latch 86, as explained in connection with Fig. 8. The relation of the calipering and testing devices to each other is clearly shown in Fig. 6.

Fig. 11 illustrates a belt shifting mechanism which is operated by means of the weight 87 to disconnect the power. In this figure, 105 is a shaft from which both the feeding machine and the printing machine may be driven by ordinary connections, not illustrated in the drawings. 106 is a belt connecting the shaft 105 with any suitable source of power, this belt being operative upon the fast and loose pulleys 107 and 108 respectively. A manually controlled shifting lever 109 is pivoted to a suitable support at 110, and provided with a yoke 111 which loosely engages the belt. The yoke 111 is attached to a sliding block 112, which, when actuated by the lever 109 to shift the belt to the fast pulley 107, is moved against the tension of a spring 113, and is locked in such position by a latch 114 movable in suitable slide bearings in frame pieces 115 and 116. The latch is provided with a shoulder 117 adapted to engage the frame piece 115 when the belt is shifted to the pulley 107. When the weight 87 is dropped, it strikes one end of a lever 118, the other end of which extends underneath the latch 114, the weight being thus made effective to lift the latch until its shoulder 117 is disengaged from the frame piece 116, whereupon the re-action of the spring, pushing upon the block 112, shifts the belt to the loose pulley 108, and the machinery will then come to rest. The lever 118 is fast on a rock shaft 120. This shaft is provided with an arm 121 which engages a slide 122 which normally supports a weighted brake lever 123. When the lever 118 is oscillated by the dropping weight 87, the slide is withdrawn from its supporting position and the brake lever is permitted to drop and set the brake 125 on a fly wheel 126, the brake being mounted on a rock shaft 127 connected with brake lever 123.

Figure 3:
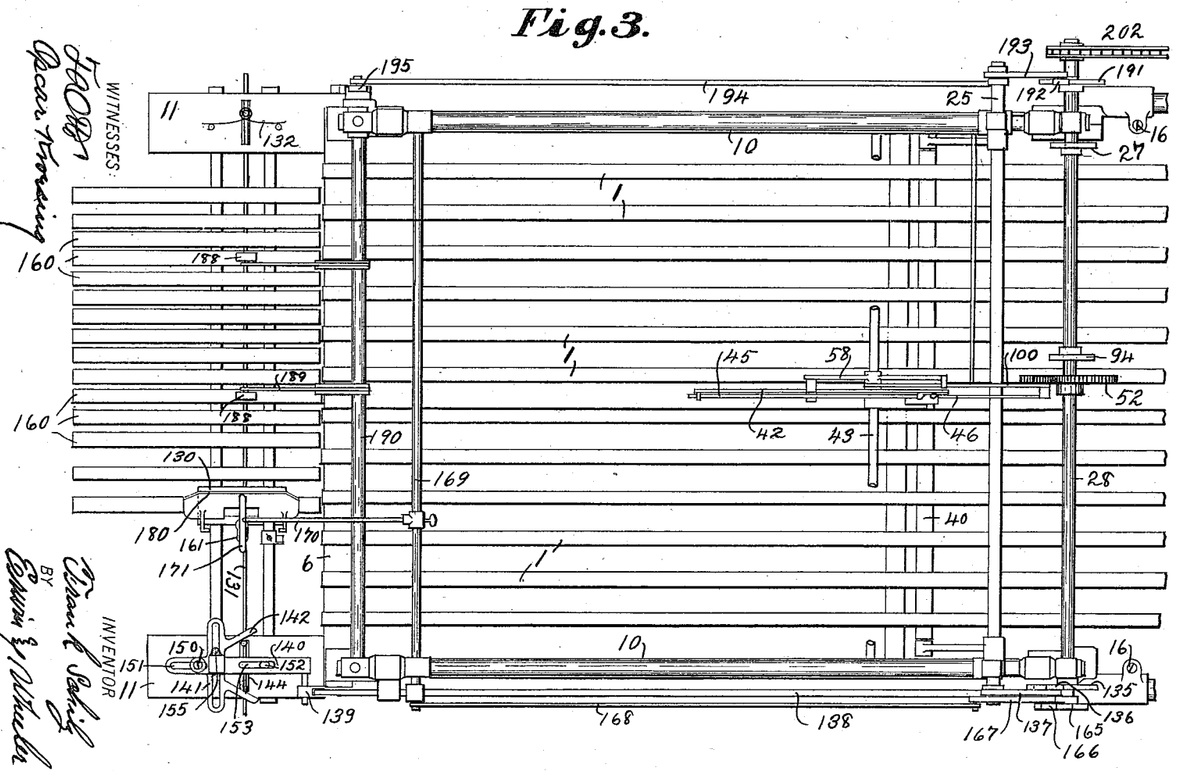
Figures 16, 17:
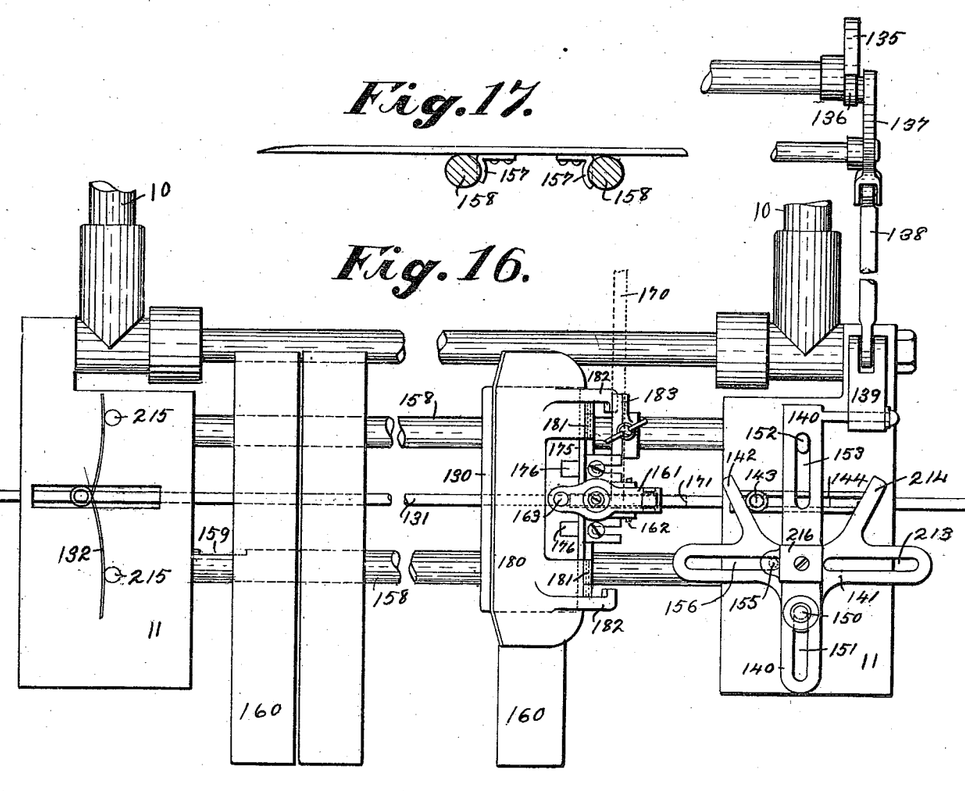
Fig. 16 is a plan view of the gage and gage operating connections, whereby the sheet is accurately alined for final delivery.
Fig. 17 is a detail side view of one of the slide plates over which the paper is delivered by the conveyer tapes.

The gage mechanism is best shown in Figs. 3, 5 and 16. This mechanism however, is made the subject of a separate application and is not claimed herein. A gage plate 130 is connected with a slide rod 131 near the lower end of the machine frame and is actuated in one direction by a spring 132. At intervals, however, the gage member is pushed against the tension of the spring by a cam 135 which transmits this motion through the cam roller 136, lever 137, links 138, 139 and 140, and an oscillatory member 141, which is provided with an angularly extending arm 142 adapted to engage a pin 143 adjustably mounted in a slot 144 in the slide rod 131. The member 141 is secured to the head piece 11 by a pin 150, which pin extends through a slot 151 in the link 140 and coöperates with a pin 152, extending through a slot 153 in said link, whereby the link is caused to reciprocate lineally. Another pin 155 is rigidly connected with the central portion of the link 140 and extends through a slot 156 in the member 141, whereby a movement of the link 140 causes the member 141 and arm 142 to swing. The cam 135, in pushing the roller 136 outwardly to the longer radius, exerts a pull upon the link 138, which is transmitted as above explained, to swing the arm 142 and pull the arm 131 laterally against the tension of the spring 132. When the roller 136 again reaches the short radius of the cam 135, the spring 132 retracts the rod 131, and through the engagement of the pin 143 with the arm 142, restores the member 141 and the links to their original position, the gage plate 130 having been thus drawn laterally by the cam and returned to normal position by the spring. The cam 135 is arranged to permit the retraction of the rod 131 by the spring 132 immediately after the sheet of paper has been delivered by the tapes upon the slide plates 160, the gage plate 130 being thus brought into contact with one edge of the sheet, whereby the sheet is pushed slightly to the left in Fig. 16, and then held by a gripping member comprising lever 161 pivotally connected with gage plate 130 at 162 and provided with a tip 163 of rubber or other material suitable for contact with the paper. The end of the lever 161 provided with this tip, extends over the gage plate 130 and a spring 164 tends to hold it down in position to grip a sheet of paper thereon. The lever is normally held in a raised position however, by a cam 165 on shaft 28, operating through cam roller 166, lever 167, link 168 spring actuated crank shaft 169, arm 170 and cross head 171, the latter being adapted to bear upon the raised end of lever 161 in all positions of gage plate adjustment. When the cam 165 is at short radius, spring 164 moves the gripping tip 163 downwardly into contact with the paper, preparatory to the retractive movement of the gage plate when cam 135 operates at its longer radius. When the gage plate is moved against the edge of the sheet preparatory to the engagement of the latter by the gripping member, the edge of the sheet contacts with the raised shoulder 175 on the gage plate and extends underneath raised tongues 176, which project in an angular position upwardly from said shoulder 175, these tongues 176 serving to prevent the margin of the sheet from lifting or buckling. Where the machine is subjected to strong drafts of air, it is desirable to provide additional means for preventing the margins of the sheets from lifting in the air currents. This is accomplished by a flap 180 which is hinged to the gage plate at 181, and is held in an angular position by arms 182, engaging under wedge guides 183 when the parts are in the position in which they are shown in Fig. 16. The flap 180 is in this raised position while the sheet is being delivered by the tapes. As the reaction spring 132 draws the gage plate to the left and away from the guides 183 the flap 180 then drops until it contacts with the shoulder 175, which holds it in a position parallel with the gage plate 130, and a short distance above the gage plate, thus depressing the margin of the sheet of paper if the latter is raised and holding this margin of the sheet in such depressed position until its edge is alined with the shoulder 175 and the sheet engaged by the gripping member 162, as the sheet is drawn to the right by the operation of the cam 135, the arms 182 again pass underneath the wedge members 183 and lift the flap 180 preparatory to the removal of the sheet by the printing press grips and the delivery of the next sheet by the tapes.

The slide plates 160 are provided with curved depending clips 157 which engage the frame rods 158 as best shown in Fig. 17. These slides may be removed in an obvious manner by shifting them along the rods 158 to the notch 159 in one of the rods.

The gage plate 130 and connected parts are adjustably connected with the rod 131 by a coupling 174 whereby it may be shifted to various positions in accordance with the width of the sheets and the number of slide plates 160 is therefore varied correspondingly. The arm 171 is also correspondingly shifted along the rod 170 and held in any adjusted position by an ordinary set screw.

Figure 14:
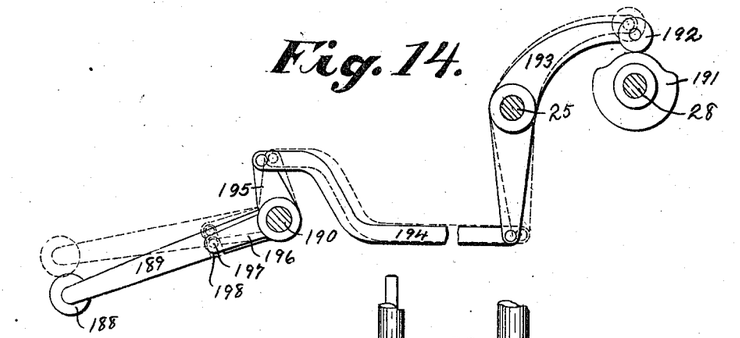
Fig. 14 is a detail side view of the sheet holding rollers, together with an actuating cam, and motion transmitting connections therefor.
Figure 15:
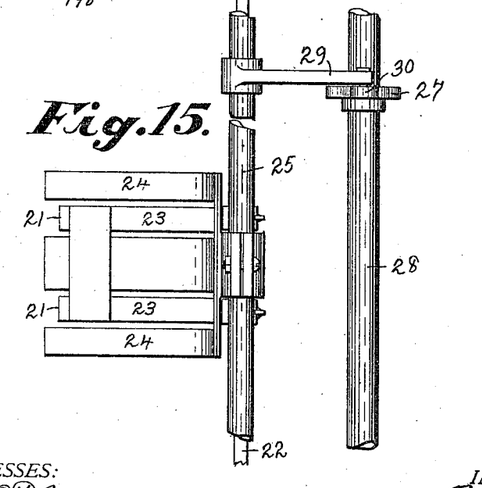
Fig. 15 is a detail plan view of one of the strikers with its supporting and actuating shafts.
Figures 18, 19, 20:
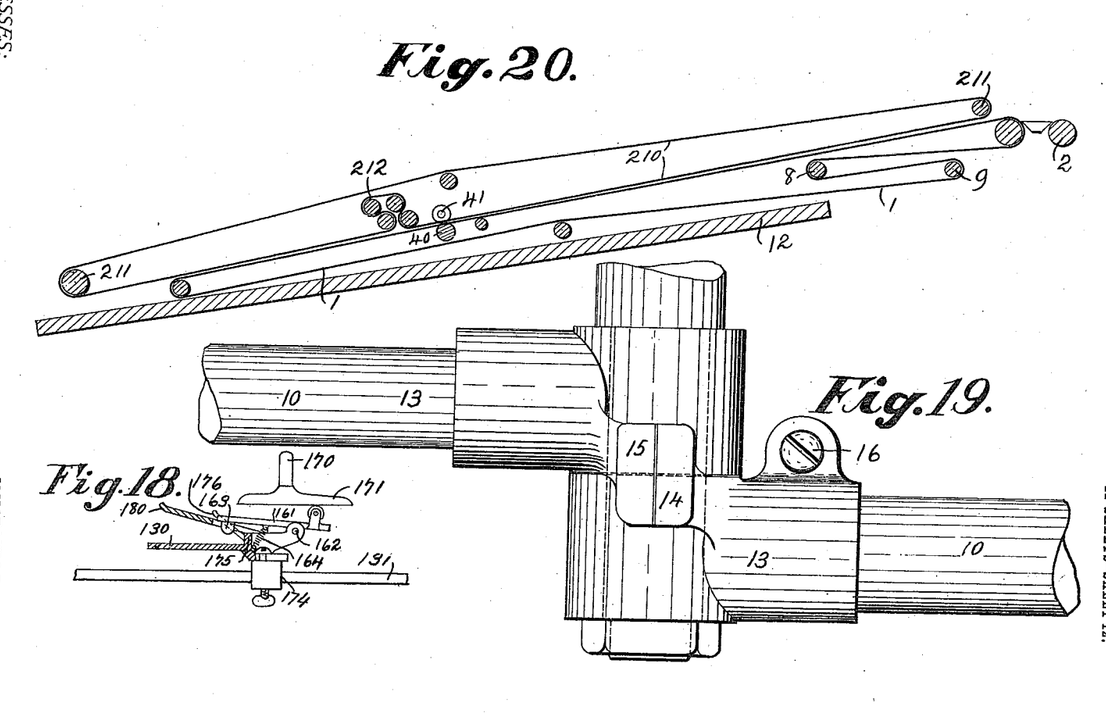
Fig. 18 is a section on line X—X of Fig. 16.
Fig. 19 is a plan view of one of the frame joints.
Fig. 20 is a detail view in longitudinal section illustrating the arrangement of the conveyer tapes, and showing also a form of construction in which auxiliary tapes may be employed in cases where strong drafts of air are likely to interfere with the feeding operation.

Additional means for holding the sheets when subjected to drafts of air are illustrated in Figs. 5 and 14 and consist of a series of rollers 188 supported by arms 189 from an oscillatory cross shaft 190, which passes loosely through the arms 189. The shaft 190 is oscillated from a cam 191 on the rotary shaft 28 through the cam roller 192 and lever 193 link 194 and an arm 195 which is rigidly connected with the shaft 190. The shaft 190 is also provided with arms 196 having pins 197, which engage in notches 198 in the arms 189, whereby a backward pull on the link 194 oscillates the shaft 190, which communicates its motion to lift the arms 189 and rollers 188 out of contact with the paper immediately prior to the time of final sheet delivery to the printing press, the rollers 188 being permitted to drop by gravity to normal position as soon as the next sheet is delivered from the tapes to the plates 160, and the paper adjusted by the gage. If desired, an auxiliary system of tapes 210 may be used for this purpose by providing supporting rollers 211 and tape tightening rollers 212 as shown in Fig. 20.

It will be observed that the various movements of the sheet adjusting, testing, calipering and holding mechanism are controlled by means of cams on the rotary shaft 28. This shaft is driven from the main driving shaft 2, through the gear wheel 3, pinion 4, and gear wheels 200 and 201, and a sprocket chain 202 operating over suitable sprocket pinions connected with the gear wheel 201 and the shaft 28 respectively. The various cams 27, 94, 135, 165 and 191 are all mounted rigidly on the shaft 28, and are adjusted thereon with reference to their surface contours, in such relation that the various operations of the machine take place continuously and in regular sequence, as follows:—
A sheet received at the upper or front end
of the tape conveyer, is carried downwardly
until arrested by the striker hooks 21, which
project downwardly between the tapes, the
testing member 75 being in raised position.
This member is then depressed to test the
presence of the sheet and again lifted by
the cam 94 after which the striker hooks are
raised by the cam 29 to permit the advancement
of the sheet by the tapes. The sheet
then passes underneath the calipering roller
41 and downwardly over the lower or rear
end of the conveyer to the slides 160 where
its motion is again arrested by the strikers
206 of the printing or ruling machine, the
rear portion of the sheet being still on the
tapes unless the sheet is unusually small. In
this position one edge of the sheet rests
upon the gage plate 130 which is at the
time retracted laterally by the cam 135, (the
gage plate having previously been adjusted
on the rod 131 so that in this position it
will receive the edge of the sheet). The
cam 135 then allows the gage plate to move
to the left under the pull exerted by the
spring 132 thus assuring the contact of the
edge of the sheet with the shoulder 175
underneath the members 176. During this
movement, the flap 180 drops by gravity
to a horizontal position to prevent the sheet
from lifting. The arm 171 is in a lowered
position during this movement, but on completion
of the left hand movement of the
gage plate, the cam 165 raises this arm and
permits the depression of the gripping member
163 under tension of spring 164 to forcibly
engage the sheet and bind it to the gage
plate. The cam 135 then draws the gage
plate to the right and the sheet is in position
for final delivery to the press, whereupon
the cam 191 allows the holding rollers 188
to be depressed by gravity into contact
therewith and the gripping member released
by the action of the cam 165 in permitting
the arm 171 to be lifted by the tension of
the spring 207. The holding rollers 188 are
again lifted by the cam 191 just prior to
the engagement of the sheet by the printing
press grips. Under ordinary conditions,
however, the rollers 188 may be dispensed
with if desired.

It will be observed that the gage actuating
member 141 is provided with a slot at 213
similar to the slot 156, but extending in the
opposite direction from the center of the
plate, and an arm 214 extends diagonally
outwardly, at an equal angle but in the opposite
direction from the arm 142. Also
that the spring 132 is arranged with its ends
abutting vertical posts 215 on one of the
head pieces 11 but is otherwise unconnected
with the frame. These features of the machine
enable me to adjust the gage member
for operation in either direction. To reverse
the position of the gage member it is first
uncoupled from the rod 131, turned in the
opposite direction, and again secured to the
rod near the left hand side of the machine.
The spring 132 is then adjusted to the other
side of the posts, and the clip 216 which carries
the pin 155 is reversed in position, with
the pin 155 entered in the slot 213, and the
pin 143 abutting the arm 214. The gage
member will then act upon the left hand
edge of the sheet.

Figure 10:
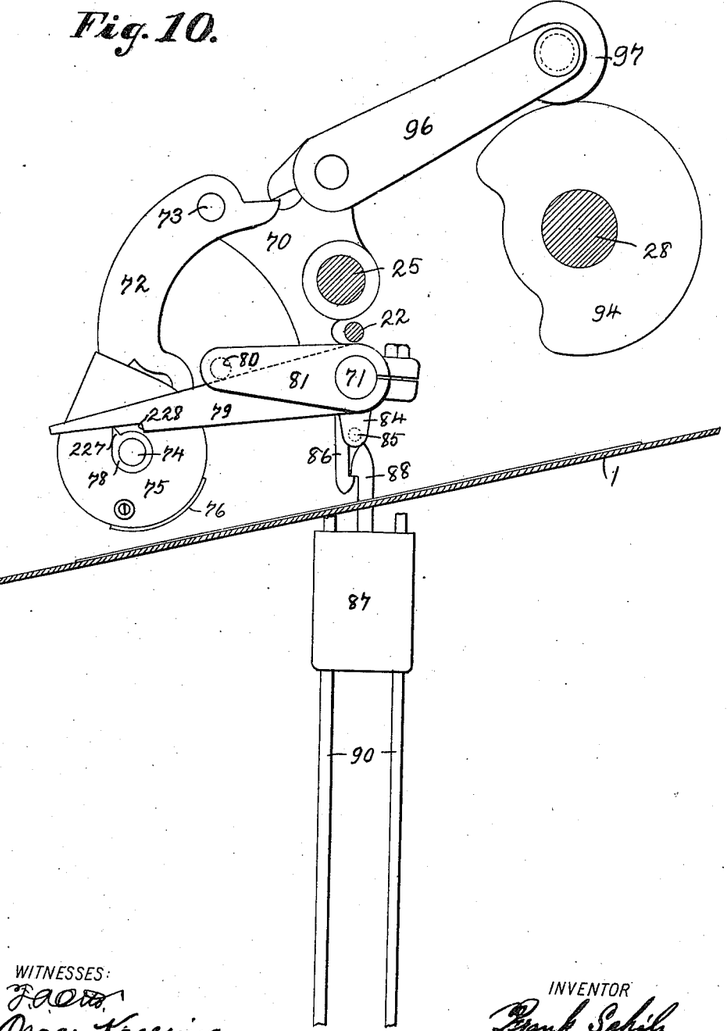
Fig. 10 is a side view of the same parts shown in Fig. 8 as they appear in raised position.

Referring again to Figs. 8 and 10 it will
be observed that the cam 78 is provided with
a projection 227 in the form of a tooth,
which operates the lever 79. This lever
79 has a shoulder 228, against which the
toothed cam projection 227 abuts as shown
in Fig. 10, when the testing member is again
raised after the cam has been oscillated out
of its normal position on the pivot by a conveyer
contact. When the testing member
again swings downwardly the shoulder 228
pushes against projection 227 and swings the
member 75 on its pivot to its normal position,
the projection being then withdrawn
from the shoulder to the position in which it
is shown in Fig. 8.

Having thus described my invention, what
I claim as new and desire to secure by Letters
Patent is,

1. In a machine of the described class, the
combination with a conveyer for sheets of
paper, of a sheet stopping mechanism; an
oscillatory member; means for depressing
said member into contact with a sheet when
the latter is at rest; said member being positioned
for contact with the conveyer in the
absence of the sheet when the member is depressed,
and connections for transmitting
motion from said member to stop the conveyer
when the member is oscillated by contact
with the conveyer.

2. In a machine of the described class, the
combination with a conveyer for sheets of
paper, of a sheet stopping mechanism and
conveyer stopping mechanism; an oscillatory
member; means for lowering and raising the
same at intervals into and out of contact
with the conveyer or with a sheet of paper
thereon when engaged by the sheet stopping
mechanism; said member being adapted to
be oscillated by friction of the conveyer
when in contact therewith; and connections
for transmitting such oscillatory movement
of said member to operate the conveyer stopping
mechanism.

3. In a machine of the described class, the
combination with a conveyer for sheets of
paper; of a swinging support, with one end
arranged to move automatically to and from
the conveyer at intervals; a member mounted
to oscillate on said support and adapted
for contact with the conveyer; and conveyer
stopping mechanism controlled by said
member.

4. In a machine of the described class, the combination with a conveyer for sheets of paper; of a transversely disposed rotary shaft above the conveyer; a sheet stopping device actuated from said shaft at regular intervals into and out of the path of paper on the conveyer; a testing device actuated from said shaft and moved to and from the conveyer during the sheet stopping interval; said testing device being arranged for contact with a sheet held by the stopping device, and adapted to be actuated by the conveyer in the absence of a sheet during the sheet stopping interval; and connections, adapted to transmit motion from the testing device, when actuated by the conveyer, to stop the conveyer.

5. In a machine of the described class, the combination with a conveyer, of a transversely disposed rotary shaft; a testing lever pivotally connected with a support above the conveyer; a member mounted to oscillate on one end of the lever; a cam mounted on the rotary shaft; a cam actuated lever for transmitting motion to the testing lever to swing the oscillatory member to and from the conveyer and connections adapted to transmit motion from the oscillatory member to stop the conveyer.

6. In a machine of the described class, the combination with a conveyer for sheets of paper and conveyer stopping mechanism, of a testing device comprising an oscillatory member mounted upon a swinging support; a projection connected with the oscillatory member; a rock shaft having an arm adapted to be actuated by said projection, and means for communicating motion from the rock shaft to the conveyer stopping mechanism.

7. In a machine of the described class, the combination with a conveyer for sheets of paper and weight actuated conveyer stopping mechanism, of an actuating weight for said mechanism; latch and catch devices for normally supporting the weight in inoperative position; a rock shaft provided with a connection adapted to release the weight; an oscillatory member adapted to be actuated by frictional contact with a moving body; means for moving the same to and from the conveyer; means for arresting sheets of paper in the path of said member; and means for transmitting motion from said member to said rock shaft, when the member is actuated by the conveyer.

8. In a machine of the described class, the combination with a conveyer for sheets of paper and weight actuated conveyer stopping mechanism, of an actuating weight for said mechanism; latch and catch devices for normally supporting the weight in inoperative position; a rock shaft provided with a rigidly connected arm adapted to release the weight; an arm loosely connected therewith and adapted to engage a projection on the rigidly connected arm; an oscillatory member adapted, when oscillated in one direction, to actuate the loose arm; and means for moving the oscillatory member into and out of contact with the conveyer, or with a sheet of paper thereon; together with means for arresting the movement of the paper prior to the contact of said member therewith.

9. In a machine of the described class, the combination with a conveyer for sheets of paper, and a driving shaft, of belt and pulley connections for driving the same; a belt shifting device; a spring arranged to push the belt shifting device to inoperative position; a trip catch for holding the belt shifting device in operative position; a lever supported to release the trip latch; and a weight adapted to actuate said lever; together with means for normally supporting said weight; and means controlled by sheets of paper on the conveyer for releasing the weight.

10. In a machine of the described class, the combination with a conveyer for sheets of paper, and a driving shaft, of belt and pulley connections for driving the same; a belt shifting device; a spring arranged to push the belt shifting device to inoperative position; a trip catch for holding the belt shifting device in operative position; a lever supported to release the trip latch; and a weight adapted to actuate said lever; together with means for normally supporting said weight; and means controlled by sheets of paper on the conveyer for releasing the weight; and a brake mechanism also arranged to be actuated by said weight to check the motion of said shaft and conveyer.

11. In a machine of the described class, the combination with a conveyer, of a calipering mechanism comprising a wheel mounted upon a swinging lever and arranged for contact with the material carried by the conveyer; a rotary shaft; a wheel mounted thereon; a swinging support; a cam mounted upon the swinging support, and adapted to be brought into contact with said wheel; latch and catch mechanism adapted to hold said cam normally out of contact with the wheel; and connections for transmitting motion from the supporting lever of said calipering wheel to disengage said latch and catch mechanism.

12. The combination with a conveyer for sheets of paper, of a stationary bracket supported above the conveyer; a set of interconnected compounding levers pivotally connected with the bracket; a calipering roller connected with one of the levers and adapted to rotate in contact with sheets of paper carried by the conveyer; conveyer stopping mechanism; and trip mechanism controlling the same; said trip mechanism being arranged to be actuated by one of said levers.

13. In a machine of the described class, the combination with a conveyer for paper sheets, of a transversely disposed rotary shaft; a conveyer stopping mechanism; a movable member controlling the conveyer stopping mechanism; a member mounted on the rotary shaft adapted to engage and actuate the controlling member; trip mechanism adapted to normally hold the controlling member from contact with the actuating member; and a calipering wheel controlling the trip mechanism.

14. In a calipering mechanism for paper feeding machines, the combination of a calipering wheel mounted on a movable support; a set of compounding levers arranged to transmit the motion of the calipering wheel support; and a trip mechanism actuated by said levers; one of said levers being provided with a worm shaft meshing with a toothed segment on another lever, whereby the relation of said levers to each other may be varied.

15. In a calipering mechanism for paper feeding machines, the combination of a calipering wheel, a movable support therefor; a set of compounding levers arranged to transmit the motion of the calipering wheel support; and a trip mechanism actuated by said levers; one of said levers being provided with a worm shaft meshing with a toothed segment on another lever, whereby the relation of said levers to each other may be varied to increase or diminish the degree of motion required for the release of the trip mechanism.

16. In a calipering device for paper feeding machines, the combination of a trip mechanism; a calipering wheel; and a set of compounding levers for transmitting motion from the calipering wheel to the trip mechanism; together with means for adjusting said levers with reference to each other to increase or decrease the delicacy of trip engagement; said means comprising a toothed segment on one of the levers; and a worm shaft in mesh therewith, and mounted in suitable bearings on another of said levers, the motion of one lever to another being transmitted through said worm shaft and segment.

17. The combination with a conveyer for sheets of paper, of a lever provided with a roller arranged for contact with the sheets, a second lever provided with a rotary cam, conveyer stopping devices operatively connected with the second lever, a rotary member adapted to actuate the cam, trip mechanism adapted to normally hold the cam out of contact with the rotary cam actuating member, and connections adapted to be actuated by the first mentioned lever to release the trip and permit the cam to swing into contact with said actuating member at a point where the motion of the latter will be transmitted through the cam to the cam supporting lever.

18. The combination with a conveyer for sheets of paper, of a lever provided with a roller arranged for contact with the sheets, a second lever provided with a rotary cam, conveyer stopping devices operatively connected with the second lever, a rotary member adapted to actuate the cam, trip mechanism adapted to normally hold the cam out of contact with the rotary cam actuating member, and connections adapted to be actuated by the first mentioned lever to release the trip and permit the cam to swing into contact with said actuating member at a point where the motion of the latter will be transmitted through the cam to the cam supporting lever, said actuating member being adapted to rotate the cam one complete revolution after each contact, whereby it is automatically reëngaged with the trip.

In testimony whereof I affix my signature in the presence of two witnesses.

FRANK SCHILZ.

Witnesses:
  LEVERETT C. WHEELER,
  JAS. B. ERWIN.